US008482440B2

(12) United States Patent
Lee et al.

(10) Patent No.: US 8,482,440 B2
(45) Date of Patent: Jul. 9, 2013

(54) METHOD FOR HIGH THROUGHPUT PARALLEL AVC/H.264 CONTEXT-BASED ADAPTIVE BINARY ARITHMETIC CODING DECODER

(75) Inventors: Gwo Giun Lee, Tainan (TW); He-Yuan Lin, Tainan (TW); Jia-Wei Liang, Tainan (TW); Ching-Jui Hsiao, Tainan (TW)

(73) Assignee: National Cheng Kung University, Tainan (TW)

( * ) Notice: Subject to any disclaimer, the term of this patent is extended or adjusted under 35 U.S.C. 154(b) by 0 days.

(21) Appl. No.: 13/474,106

(22) Filed: May 17, 2012

(65) Prior Publication Data
US 2012/0293343 A1 Nov. 22, 2012

Related U.S. Application Data

(60) Provisional application No. 61/486,869, filed on May 17, 2011.

(51) Int. Cl.
*H03M 7/00* (2006.01)
(52) U.S. Cl.
USPC ............................... 341/107; 341/51; 341/106
(58) Field of Classification Search
USPC .......................................................... 341/107
See application file for complete search history.

(56) References Cited

U.S. PATENT DOCUMENTS

| 7,079,057 B2* | 7/2006 | Kim et al. ...................... 341/107 |
| 7,365,660 B2* | 4/2008 | Park et al. ..................... 341/107 |
| 7,385,535 B2* | 6/2008 | Yang et al. .................... 341/107 |
| 7,408,487 B2* | 8/2008 | Cho ............................... 341/107 |
| 7,522,076 B1* | 4/2009 | Hsu et al. ....................... 341/107 |
| 7,557,740 B1* | 7/2009 | Hsieh et al. .................... 341/107 |
| 2011/0248871 A1* | 10/2011 | Kim et al. ....................... 341/51 |

OTHER PUBLICATIONS

Yao-Chang Yang et al., High-Throughput H.264/AVC High-Profile CABAC Decoder for HDTV Applications, IEEE Transactions on Circuits and Systems for Video Technology, Sep. 2009, pp. 1395-1399, vol. 19, No. 9.
Pin-Chin Lin et al., A Branch Selection Multi-symbol High Throughput CABAC Decoder Architecture for H.264/AVC, DSP/IC Design Lab, Graduate Institute of Electronics Engineering and Department of Electrical Engineering, National Taiwan University, Taipei, Taiwan, IEEE 978-1-4244-3828-0-09, 2009, pp. 365-368.
Peng Zhang et al., Variable-Bin-Rate CABAC Engine for H.264/AVC High Definition Real-Time Decoding, IEEE Transactions on Very Large Scale Integration (VLSI) Systems, Mar. 2009, pp. 417-426, vol. 17, Issue 3.
Hisao Sasai, CE1: Subset A: Parallel context processing for coefficient coding using block-based context updates, Joint Collaborative Team on Video coding (JCT-VC) of ITU-T SG 16 WP3 and ISO/IEC JTC1/SC29/WG11, 7th Meeting: Geneva, CH, Nov. 21-30, 2011, 6 Pages, Document: JCTVC-G349rl.
Rajan Joshi et al., CE1: Delayed state update for CABAC, Joint Collaborative Team on Video Coding (JCT-VC) of ITU-T SG16 WP3 and ISO/IEC JTC1/SC29/WG11, 7th Meeting: Geneva, CH, Nov. 21-30, 2011, 5 Pages, Document: JCTVC-G576-r2.

* cited by examiner

*Primary Examiner* — Khai M Nguyen
(74) *Attorney, Agent, or Firm* — Volpe and Koenig, P.C.

(57) ABSTRACT

Methods for decoding are provided. The proposed method includes steps of: receiving a most probable symbol (MPS) value and a probability value for generating a probability model update; and receiving the probability model update for generating the MPS value and the probability value, wherein when the probability value shows that an MPS is occurred, a path corresponds to the MPS is estimated and a first bin included in the path is decoded beforehand.

11 Claims, 5 Drawing Sheets

METHOD FOR HIGH THROUGHPUT PARALLEL AVC/H.264 CONTEXT-BASED ADAPTIVE BINARY ARITHMETIC CODING DECODER

The application claims the benefit of U.S. Provisional Patent Application No. 61/486,869, filed on May 17, 2011, in the USPTO, the disclosures of which are incorporated herein in their entirety by reference.

FIELD OF THE INVENTION

The present invention relates to a method for a high throughput parallel AVC/H.264 context-based adaptive binary arithmetic coding (CABAC) decoder. More particularly, it relates to a method for a high throughput parallel AVC/H.264 CABAC decoder having a step of estimating a path corresponding to a most probable symbol (MPS) and decoding a first bin included in the path beforehand.

BACKGROUND OF THE INVENTION

The CABAC is an important technique of AVC/H.264, and the CABAC is not only taken a place in the image compression standard of AVC/H.264 but also is an indispensable coding scheme in the newly set image compression standard of the future due to that the CABAC decoder can efficiently improve the compression efficiency in coding.

If the output rate of the CABAC decoder can be effectively raised via increasing the degree of parallelism of the binary arithmetic coding of the CABAC decoder and the CABAC decoder can cope with the support of the configuration having a higher standard of specification, then the efficiency of the CABAC decoder can be improved dramatically.

Keeping the drawbacks of the prior arts in mind, and employing experiments and research full-heartily and persistently, the applicant finally conceived a method for a high throughput parallel AVC/H.264 context-based adaptive binary arithmetic coding decoder.

SUMMARY OF THE INVENTION

It is therefore an object of the present invention to provide an algorithm of AVC/H.264 CABAC decoder having the advantage of high throughput; the designed architecture is realized based on the top-down design methodology, the algorithm analysis and the dataflow models in both high and low granularities; the similarity between CABAC decoder and Viterbi decoder is summarized according to further analysis towards the algorithm, and the degree of parallelism of the CABAC decoder can be increased via this similarity to effectively raise the output rate of the CABAC decoder.

According to the first aspect of the present invention, a method for a context-based adaptive binary arithmetic coding (CABAC) decoder comprises steps of: receiving a bitstream, a range update, a most probable symbol (MPS) value, and a probability value to generate a bin and a probability model update; receiving the bin and generate a syntax element; receiving the probability model update, a context information, a sequence information, a picture information, a slice information and an initialized context variable to generate the MPS value and the probability value; using the context information to estimate a path having a relatively larger probability of occurrence when the bin is decoded, and decoding each the bin included in the path beforehand; receiving the slice information to generate the initialized context variable; and going back to the bitstream receiving step unless an end is reached.

According to the second aspect of the present invention, a method for a context-based adaptive binary arithmetic coding (CABAC) decoder comprises steps of: receiving a bitstream, a range update, a most probable symbol (MPS) value, and a probability value to generate a bin and a probability model update; receiving the probability model update, a context information, a sequence information, a picture information, a slice information and an initialized context variable to generate the MPS value and the probability value, wherein the context information is used to estimate a path having a relatively larger probability of occurrence when the bin is decoded and each the bin included in the path is decoded beforehand; when a bypass binary arithmetic decoding is engaged, decoding each the bin included in a path corresponding to the bypass binary arithmetic decoding beforehand also to raise a degree of parallelism of the method; and going back to the bitstream receiving step unless an end is reached.

According to the third aspect of the present invention, a decoding method comprises steps of: receiving a most probable symbol (MPS) value and a probability value to generate a probability model update; and receiving the probability model update to generate the MPS value and the probability value, wherein when the probability value shows that an MPS is occurred, a path corresponding to the MPS is estimated and a first bin included in the path is decoded beforehand.

The present invention may best be understood through the following descriptions with reference to the accompanying drawings, in which:

DETAILED DESCRIPTION OF THE PREFERRED EMBODIMENT

According to the provided parallel binary arithmetic coding scheme of the preferred embodiment of the present invention, a method for a high throughput parallel AVC/H.264 context-based adaptive binary arithmetic coding decoder is proposed. The present invention enlarges the parallelization of the binary arithmetic coding. According to the experimental results of the present invention, the proposed context-based adaptive binary arithmetic coding decoder can be employed to support AVC/H.264 High Profile, 4.2 Level, and 1920×1088 resolution at 64 frames per second. By increasing the degree of parallelism of bin decoding, the throughput of the proposed architecture is shown by the experiments to have improved 3.5 times as compared with the original sequential bin decoding.

Besides, since HEVC is a new standard not being set up yet, it has a higher flexibility during the design stage. In the JCTVC meeting which standardizes emerge coding standard, Qualcomm has proposed a method which claims that the context model shall not be updated continuously, and various amounts of bins are delayed to achieve the increase of the outputs instead. But, the truth is this method will decrease the BD-rate therein. Also, Panasonic has provided therein that part of the syntax elements shall be delayed till the end of each block, and then the context model is updated. The references are JCTVC-G576 and JCTVC-G349 respectively. But in the present invention, the coding performance therein is not decreased due to the parallelization, and this is a unique feature of the present invention.

Table 1 as follows shows the comparison among the provided configuration and other designs (that is, designs [1], [2] and [3], wherein [1] is: Yao-Chang Yang and Jiun-In Guo, "A High Throughput H.264/AVC High Profile CABAC Decoder for HDTV Applications," IEEE Transactions on Circuits and Systems for Video Technology, Volume 19, Issue 9, pp. 1395-1399, September 2009; [2] is: Pin-Chih Lin, Tzu-Der Chuang, and Liang-Gee Chen, "A Branch Selection Multi-symbol High Throughput CABAC Decoder Architecture for H.264/AVC," IEEE International Symposium on Circuits and Systems, pp. 365-368, May 2009; and [3] is: Peng Zhang, Don Xie, and Wen Gao, "Variable-Bin-Rate CABAC Engine for H.264/AVC High Definition Real-Time Decoding," IEEE Transactions on Very Large Scale Integration (VLSI) Systems, Volume 17, Issue 3, pp. 417-426, March 2009.) Design [1] only supports the frame rate of 30 fps at 105 MHz, the decoded bins per second is 90.3M. Design [2] employs the 90 nm technology to increase the throughput, but only supports the frame rate of 30 fps at 222 MHz. Design [3] only supports AVC/H.264 Main Profile Level 4.0, 1080i and the frame rate of 30 fps at 222 MHz, and the throughput is 102 Mbins per second.

having larger probability is realized, extremely large parallel effects are obtained, and there is a fairly good trade-off between the hardware cost and the degree of parallelism.

Figure 1:
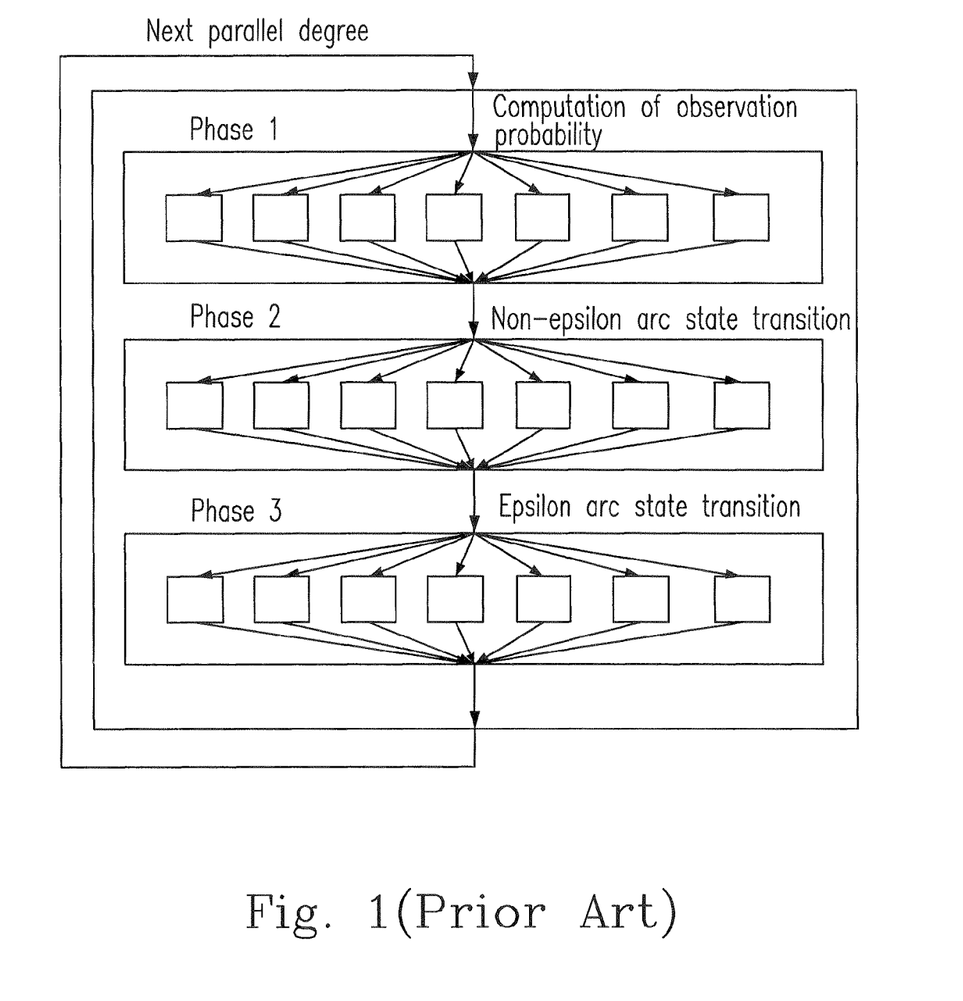
FIG. 1 is a schematic diagram of the degree of parallelism in the Viterbi decoder.

As shown in FIG. 1, the Viterbi decoder employs probability to find the probable decoding results. Although the accurate decoding results and path are not known beforehand, the parallelism can be expanded by exploring the more probable paths. Thus, the transition probability can be computed in phase 1 using context information. The probabilities derived in phase 1 will be used in phases 2 and 3 to decrease the costs of parallelization. The decoding results produced by state transitions requiring an additional input symbol are executed in phase 2, and the processes for state transitions without additional input symbol are executed in phase 3.

Figure 2:
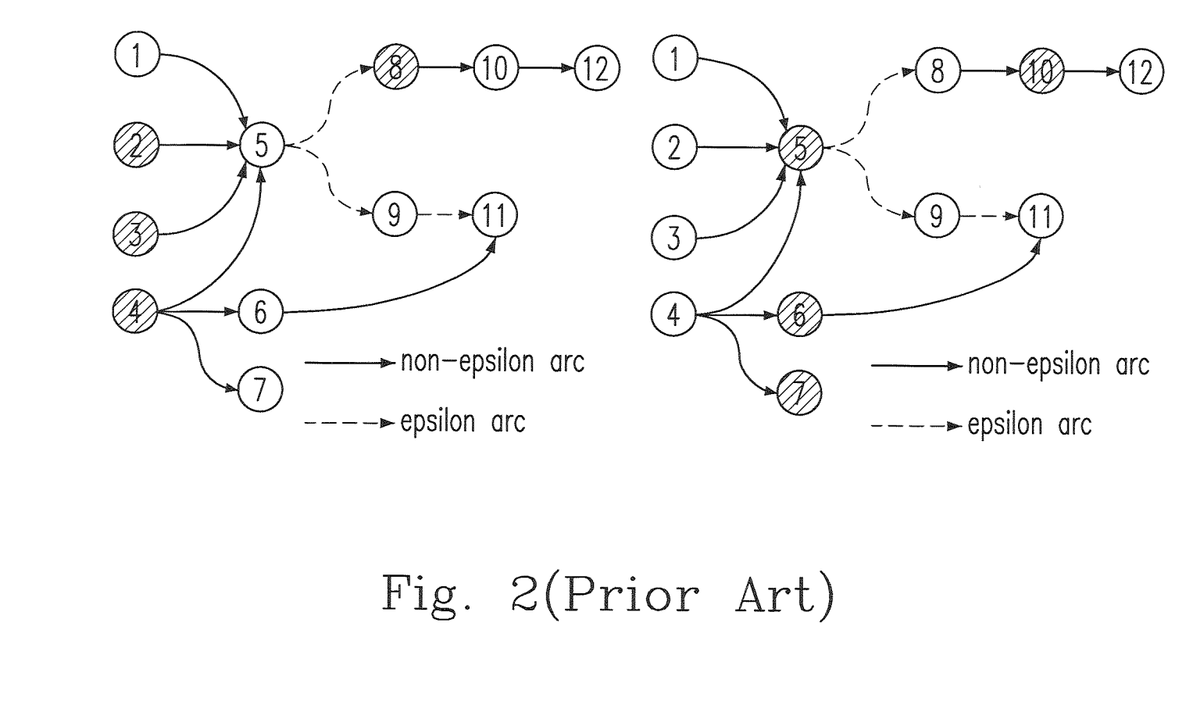
FIG. 2 is a schematic diagram of state transitions of the Viterbi decoder.
Figure 3:
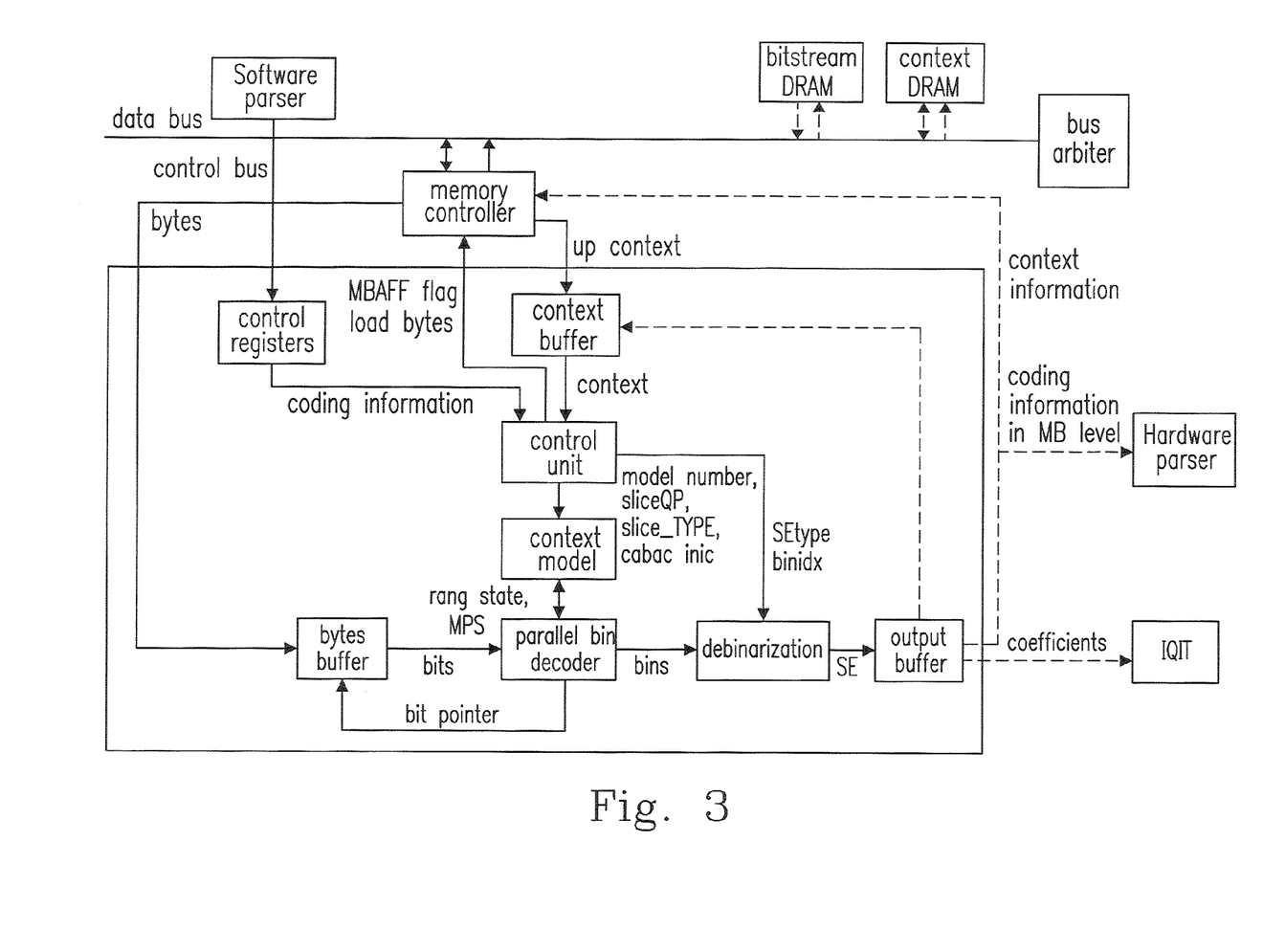
FIG. 3 is a block diagram of a CABAC decoder according to the preferred embodiment of the present invention.

The Viterbi decoder has two kinds of arcs, non-epsilon arcs and epsilon arcs. As shown in FIG. 2, the non-epsilon arcs use one input symbol to perform a state transition, but the epsilon arcs are traversed without using any input symbols. This decoding process is similar to that of CABAC decoder, because they both use the context information to produce the probability of a symbol, and the accurate path is unknown until the symbol is decoded. The non-epsilon arc is just like an LPS (Least Probable Symbol), because both require extra input. The epsilon arc is similar to an MPS (Most Probable Symbol), and both two usually do not require more input (the MPS may rarely need one bit at most). Thus, this concept of parallelization in the Viterbi decoder can also be used in the CABAC decoder.

Since the MPS is the most probable symbol, its probability is larger, and it contains less information such that a shorter range can represent it, wherein the range represents for the current remaining information in the binary arithmetic decod-

TABLE 1

Comparison between presented architecture and other designs

| design | technology | specification | clock speed | cycles/MB | bins/cycle | bins/s | test case bit rate (bit/s) | GOP structure | initial QP |
|---|---|---|---|---|---|---|---|---|---|
| [1] | TSMC 0.18 um | HP L4.1 1920 × 1088 30 fps | 105 MHz | 396 | 0.86 | 90.3M | 60M | IBBP | n/a |
| [2] | UMC 90 nm | HP L5.0 1920 × 1080 30 fps | 222 MHz | 906.86 | 1.98 | 410M | 42.84M | IBBBP IPPP | 18 |
| [3] | 0.18 | MP L4.0 1080i 30 fps | 45 MHz | 183.82 | 2.27 | 102M | n/a | n/a | n/a |
| Present Invention | TSMC 0.18 um | HP L4.2 1920 × 1088 64 fps | 108 MHz | 198 | 3.5 | 378M | 62.5M | IBP IBBBP | 28 |

The main feature of the present invention is that the algorithm of the Viterbi decoder is applied to the CABAC decoder such that the designed hardware therein can use the context information to estimate the path having larger probability of occurrence while the bins are decoded, and the bins under these more probable paths with a larger probability are decoded beforehand so as to avoid each time the present bin needs to be decoded and then the next bin can be continuously decoded according to the decoded bin. When the MPS occurs, the efficiency of decoding the bins increases, and if the MPS does not occur, then only one bin can be decoded, and a newly estimated path will be searched. With this kind of idea, although only the hardware of decoding the bins of the path ing process. In other words, the LPS has more information and will be represented by a longer range. If the current range is longer, it contains more information in this range, and this longer range represents either a series of MPSs or an LPS. Via the above-mentioned reasons, when the probability is larger, an MPS is more likely to be the decoding decision, and thus the occurrence of continuous MPSs can be assumed to extract more degrees of parallelism. Symbols decoded by bypass binary arithmetic decoding can also be decoded in parallel, but the degree of parallelism drops when an LPS occurs. Since the probable degree of parallelism is variable due to the variable length coding, a parallel architecture with variable granularity is presented, and this granularity can be several bins or a single bin.

The probable degree of parallelism are determined by three factors: firstly, the length of the MPS range (the probability value of an MPS occurring) obtained from the context state transition table indexed according to the context information, secondly, the length of the current range (the information of the following symbols), and thirdly, the length of the current offset (a mark to record the progress of the bin decoding process). The transition of syntax elements sometimes are determined by their values, so the type of syntax element to which the next bin belongs is unknown. To extract parallelism, overhead exists in prediction errors for the syntax element transition. All three aforementioned factors are used to compute the probable degree of parallelism, so that the overhead associated with parallelism expansion can be decreased. Thus, computations are required before the binary arithmetic decoding to find the probable degree of parallelism before the parallel decoding.

The higher the degree of parallelism, the greater the hardware costs, and the feasible degree of parallelism decreases as the clock speed increases. For these reasons, the selected maximum degree of parallelism in the provided parallel scheme is five. According to CCIR601, the clock speed based on the system constraints is set to 108 MHz. To ensure the data are passed through the correct path between modules at the approximated time in unit of system granularity (8×8 block), the high level data flow model is built by local memory size restriction and First-In-First-Out (FIFO) buffer between modules. The input ports and outputs of each dataflow module are required to be specified. Data at the same hierarchical level (sequence, picture, slice, macroblock, and 8×8 block levels) are packed into the corresponding data structure at different levels. Data which are necessary in system granularity required to be stored in the local buffer of modules. To model the dataflow from a module to another, the size of the local buffer in each module is limited. Thus, the exact size is accurately evaluated before modeling the dataflow.

After the implementation and the integration of high level data flow model in SystemC, the details of each module (e.g., the input/output bit-width(s), the local memory configuration, the control and status register) can be refined to form the low level data flow model. Via software/hardware co-design, as the central controller to synchronize and control all modules, the parser at high level (sequence, picture, and slice) is partitioned to embed the software, but the parser at lower level (macroblock and block) and the other modules are hardware partition. Thus, the system level architecture is produced based on the data flow model.

Figure 4:
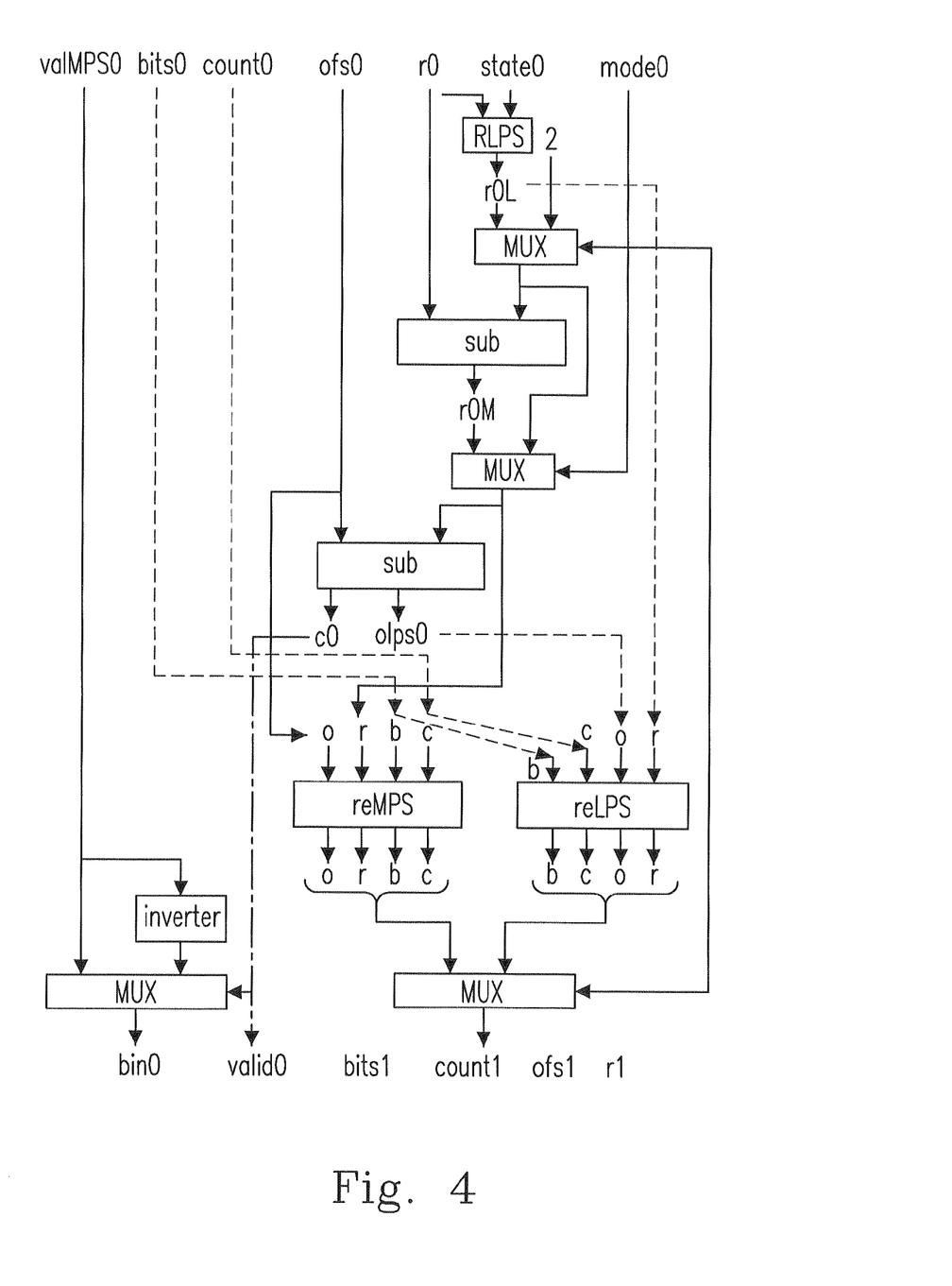
FIG. 4 is a schematic diagram of data paths of a bin decoding unit scheme according to the preferred embodiment of the present invention.

Via combining the parallel scheme, the low level data flow, and the system architecture, the provided architecture of the CABAC decoder is derived, as shown in FIG. 4. Starting at the sequence level and moving to the picture level and then the slice level, this CABAC decoder module reads the coding information from the control registers at the corresponding level. The probability initialization is executed at the beginning of each slice. Via receiving the context information and bits in the previous macroblock, the model number is derived and used in the parallel bin decoding. After bins are decoded, the de-binarization process reverses the bin string to the syntax element being stored in the output FIFO buffer.

Figure 5:
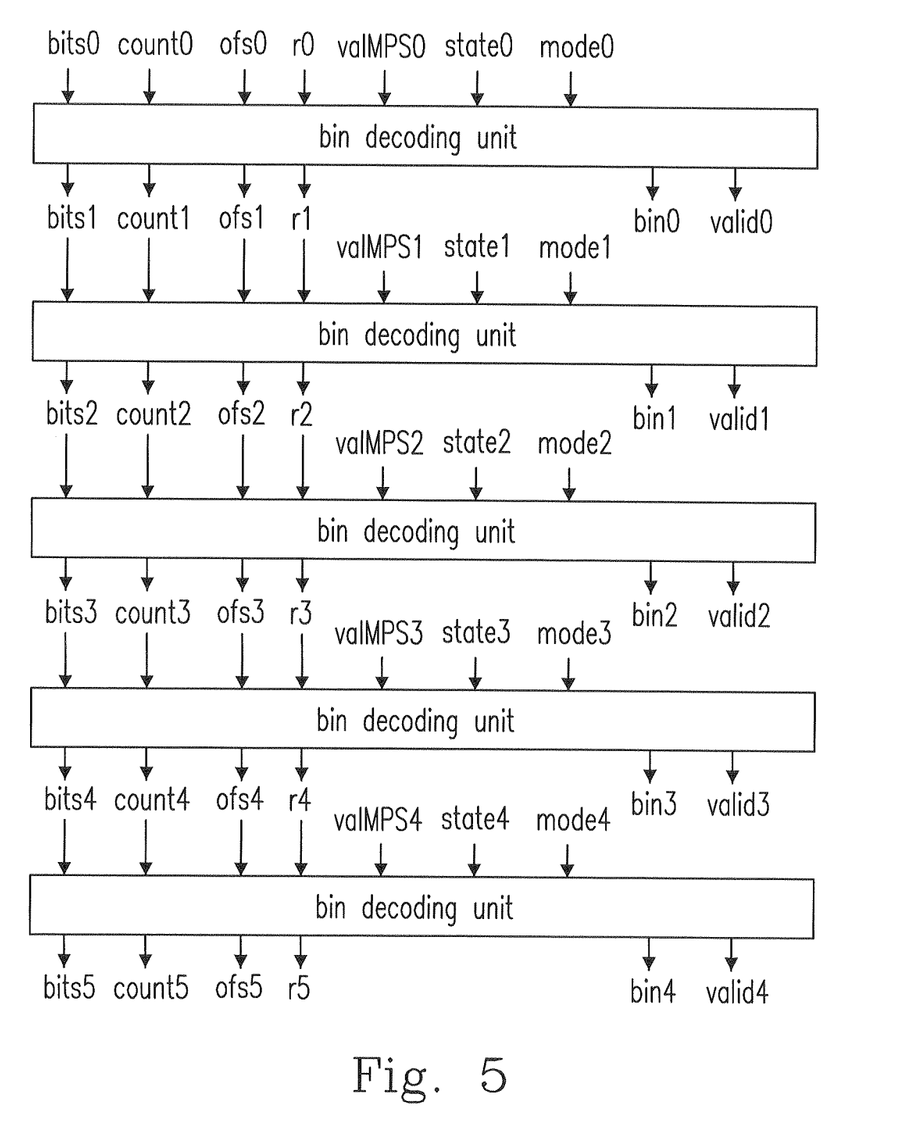
FIG. 5 is a schematic diagram of a parallel bin decoder according to the preferred embodiment of the present invention.

As shown in FIG. 4, a data path of a bin decoding unit is composed of subtractors, multiplexers, an inverter, a LPS probability table and renormalization units. Bits and count form the bitstream buffer, and bitstream is the combination of bit strings. The ofs is offset, the r is range, and both are used in the binary arithmetic decoding process. Mode, state, valMPS are three inputs from the context probability model to obtain the corresponding probability. The outputs are bin and valid flag representing the decoded bin is valid or not. The parallel degree of the presented architecture is five, so there are five bin de-coding units concatenated as shown in FIG. 5. Bits and count are the bitstream buffer used in this parallel bin decoder. Range (r0~r5) and offset (ofs0~ofs5) are the intervals in the binary arithmetic decoding process. Bin and valid are the decoded bins. When all valid flags are true, the number of output bins is actually five. In the worse case (LPS occurs), the valid flag is false, and the number of output bins decreases.

Embodiments

1. A method for a context-based adaptive binary arithmetic coding (CABAC) decoder, comprising steps of:
receiving a bitstream, a range update, a most probable symbol (MPS) value, and a probability value to generate a bin and a probability model update;
receiving the bin and generate a syntax element;
receiving the probability model update, a context information, a sequence information, a picture information, a slice information and an initialized context variable to generate the MPS value and the probability value;
using the context information to estimate a path having a relatively larger probability of occurrence when the bin is decoded, and decoding each the bin included in the path beforehand;
receiving the slice information to generate the initialized context variable; and
going back to the bitstream receiving step unless an end is reached.

2. A method according to Embodiment 1, wherein the decoder includes a context model and a probability estimation model, and the probability model update receiving step further includes steps of:
receiving the bin, a last bin value and the context information via the context model to generate a number of context model; and
receiving the number of context model and the last bin value via the probability estimation model to generate the probability value and the MPS value.

3. A method according to Embodiment 1 or 2, wherein the bin receiving step further includes a step of generating a least probable symbol (LPS) range from the context information, generating an MPS range from the MPS value, and initializing a current range and a current offset.

4. A method according to anyone of the above-mentioned Embodiments, wherein the bin receiving step further includes steps of:
engaging a regular binary arithmetic decoding;
causing a value of the bin=an LPS value when the current offset≧the MPS range, and causing the value of the bin=the MPS value when the current offset<the MPS range; and
engaging a next bin decoding process when the current range≧(½)×(an upper limit), and setting the range update=(the current range×2) and an offset update=(the current offset<<1)||(reading a bit from the bitstream) when the current range<(½)×(the upper limit).

5. A method according to anyone of the above-mentioned Embodiments, wherein the bin receiving step further includes steps of:
engaging a bypass binary arithmetic decoding;
causing the value of the bin=1 and engaging a next bin decoding process when the current offset≧the current range; and
causing the value of the bin=0 and engaging the next bin decoding process when the current offset<the current range, wherein the bypass binary arithmetic decoding requires using a bit and is decoded in parallel.

6. A method according to anyone of the above-mentioned Embodiments, wherein the MPS is represented by using a relatively less information and a relatively shorter range, and the MPS relatively rarely needs an extra information; the LPS is represented by using a relatively more information and a relatively longer range, and the LPS surely needs an extra information; the current range is one being selected from a group consisting of a series of MPSs, a series of MPSs and an LPS, an LPS followed by a series of MPSs, an LPS followed by a series of MPSs followed by an LPS, and two LPSs in sequence, and the method executes a relatively more probable path at first so as to save a hardware cost.

7. A method according to anyone of the above-mentioned Embodiments, further including a probable degree of parallelism, wherein the probable degree of parallelism is decided by three factors, that are a length of the MPS range, a length of the current range and a length of the current offset, and a maximum degree of parallelism chosen by the method is 5; the method begins with a sequence level, then moves to a picture level, further then moves to a slice level, and finally moves to a macroblock level; and the decoder reads a coding information from a control register at each of the levels, a probability initialization is executed at a beginning of a slice process, and the syntax element belongs to the macroblock level.

8. A method according to Embodiment 7, wherein the bin receiving step further includes steps of:
using the length of the MPS range, the length of the current range, and the length of the current offset to calculate the probable degree of parallelism; and
engaging a parallel binary arithmetic decoding according to the obtained probable degree of parallelism.

9. A method for a context-based adaptive binary arithmetic coding (CABAC) decoder, comprising steps of:
receiving a bitstream, a range update, a most probable symbol (MPS) value, and a probability value to generate a bin and a probability model update;
receiving the probability model update, a context information, a sequence information, a picture information, a slice information and an initialized context variable to generate the MPS value and the probability value, wherein the context information is used to estimate a path having a relatively larger probability of occurrence when the bin is decoded and each the bin included in the path is decoded beforehand;
when a bypass binary arithmetic decoding is engaged, decoding each the bin included in a path corresponding to the bypass binary arithmetic decoding beforehand also to raise a degree of parallelism of the method; and
going back to the bitstream receiving step unless an end is reached.

10. A decoding method, comprising steps of:
receiving a most probable symbol (MPS) value and a probability value to generate a probability model update; and
receiving the probability model update to generate the MPS value and the probability value, wherein when the probability value shows that an MPS is occurred, a path corresponding to the MPS is estimated and a first bin included in the path is decoded beforehand.

11. A method according to Embodiment 10, being applicable to a context-based adaptive binary arithmetic coding (CABAC) decoder, and further comprising steps of:
decoding a second bin corresponding to a least probable symbol (LPS) when the probability value indicates that the MPS is not occurred; and
when a bypass binary arithmetic decoding is engaged, decoding a third bin included in a path corresponding to the bypass binary arithmetic decoding beforehand also to raise a degree of parallelism of the method.

According to the aforementioned descriptions, the present invention provides an algorithm of AVC/H.264 CABAC decoder having the advantage of high throughput; the designed architecture is realized based on the top-down design methodology, the algorithm analysis and the dataflow models in both high and low granularities; the similarity between CABAC decoder and Viterbi decoder is summarized according to further analysis towards the algorithm, and the degree of parallelism of the CABAC decoder can be increased via this similarity to effectively raise the output rate of the CABAC decoder so as to possess the non-obviousness and the novelty.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present invention which is defined by the appended claims.

What is claimed is:

1. A method for a context-based adaptive binary arithmetic coding (CABAC) decoder, comprising steps of:
receiving a bitstream, a range update, a most probable symbol (MPS) value, and a probability value to generate a bin and a probability model update;
receiving the bin and generate a syntax element;
receiving the probability model update, a context information, a sequence information, a picture information, a slice information and an initialized context variable to generate the MPS value and the probability value;
using the context information to estimate a path having a relatively larger probability of occurrence when the bin is decoded, and decoding each the bin included in the path beforehand;
receiving the slice information to generate the initialized context variable; and
going back to the bitstream receiving step unless an end is reached.

2. A method according to claim 1, wherein the decoder includes a context model and a probability estimation model, and the probability model update receiving step further includes steps of:
receiving the bin, a last bin value and the context information via the context model to generate a number of context model; and
receiving the number of context model and the last bin value via the probability estimation model to generate the probability value and the MPS value.

3. A method according to claim 1, wherein the bin receiving step further includes a step of generating a least probable symbol (LPS) range from the context information, generating an MPS range from the MPS value, and initializing a current range and a current offset.

4. A method according to claim 3, wherein the bin receiving step further includes steps of:
engaging a regular binary arithmetic decoding;
causing a value of the bin=an LPS value when the current offset$\geq$the MPS range, and causing the value of the bin=the MPS value when the current offset<the MPS range; and engaging a next bin decoding process when the current range≧(½)×(an upper limit), and setting the range update=(the current range×2) and an offset update=(the current offset<<1)||(reading a bit from the bitstream) when the current range<(½)×(the upper limit).

5. A method according to claim 4, wherein the bin receiving step further includes steps of:
engaging a bypass binary arithmetic decoding;
causing the value of the bin=1 and engaging a next bin decoding process when the current offset≧the current range; and
causing the value of the bin=0 and engaging the next bin decoding process when the current offset<the current range, wherein the bypass binary arithmetic decoding requires using a bit and is decoded in parallel.

6. A method according to claim 4, wherein the MPS is represented by using a relatively less information and a relatively shorter range, and the MPS relatively rarely needs an extra information; the LPS is represented by using a relatively more information and a relatively longer range, and the LPS surely needs an extra information; the current range is one being selected from a group consisting of a series of MPSs, a series of MPSs and an LPS, an LPS followed by a series of MPSs, an LPS followed by a series of MPSs followed by an LPS, and two LPSs in sequence, and the method executes a relatively more probable path at first so as to save a hardware cost.

7. A method according to claim 3 further including a probable degree of parallelism, wherein the probable degree of parallelism is decided by three factors, that are a length of the MPS range, a length of the current range and a length of the current offset, and a maximum degree of parallelism chosen by the method is 5; the method begins with a sequence level, then moves to a picture level, further then moves to a slice level, and finally moves to a macroblock level; and the decoder reads a coding information from a control register at each of the levels, a probability initialization is executed at a beginning of a slice process, and the syntax element belongs to the macroblock level.

8. A method according to claim 7, wherein the bin receiving step further includes steps of:
using the length of the MPS range, the length of the current range, and the length of the current offset to calculate the probable degree of parallelism; and
engaging a parallel binary arithmetic decoding according to the obtained probable degree of parallelism.

9. A method for a context-based adaptive binary arithmetic coding (CABAC) decoder, comprising steps of:
receiving a bitstream, a range update, a most probable symbol (MPS) value, and a probability value to generate a bin and a probability model update;
receiving the probability model update, a context information, a sequence information, a picture information, a slice information and an initialized context variable to generate the MPS value and the probability value, wherein the context information is used to estimate a path having a relatively larger probability of occurrence when the bin is decoded and each the bin included in the path is decoded beforehand;
when a bypass binary arithmetic decoding is engaged, decoding each the bin included in a path corresponding to the bypass binary arithmetic decoding beforehand also to raise a degree of parallelism of the method; and
going back to the bitstream receiving step unless an end is reached.

10. A decoding method, comprising steps of:
receiving a most probable symbol (MPS) value and a probability value to generate a probability model update; and
receiving the probability model update to generate the MPS value and the probability value, wherein when the probability value shows that an MPS is occurred, a path corresponding to the MPS is estimated and a first bin included in the path is decoded beforehand.

11. A method according to claim 10 being applicable to a context-based adaptive binary arithmetic coding (CABAC) decoder, and further comprising steps of:
decoding a second bin corresponding to a least probable symbol (LPS) when the probability value indicates that the MPS is not occurred; and
when a bypass binary arithmetic decoding is engaged, decoding a third bin included in a path corresponding to the bypass binary arithmetic decoding beforehand also to raise a degree of parallelism of the method.

* * * * *